US012524352B2

(12) United States Patent
Burgess

(10) Patent No.: US 12,524,352 B2
(45) Date of Patent: Jan. 13, 2026

(54) CACHE REPLACEMENT POLICY STATE STRUCTURE WITH EXTRA STATES FOR PREFETCH AND NON-TEMPORAL LOADS

(71) Applicant: SiFive, Inc., San Mateo, CA (US)

(72) Inventor: Bradley Gene Burgess, Sunset Valley, TX (US)

(73) Assignee: SiFive, Inc., Santa Clara, CA (US)

( * ) Notice: Subject to any disclaimer, the term of this patent is extended or adjusted under 35 U.S.C. 154(b) by 119 days.

(21) Appl. No.: 18/330,607

(22) Filed: Jun. 7, 2023

(65) Prior Publication Data

US 2024/0411705 A1 Dec. 12, 2024

(51) Int. Cl.
*G06F 12/123* (2016.01)
*G06F 12/0862* (2016.01)
*G06F 12/126* (2016.01)

(52) U.S. Cl.
CPC ........ *G06F 12/123* (2013.01); *G06F 12/0862* (2013.01); *G06F 12/126* (2013.01)

(58) Field of Classification Search
None
See application file for complete search history.

(56) References Cited

U.S. PATENT DOCUMENTS 6,542,966 B1 * 4/2003 Crawford .............. G06F 12/126 711/E12.075
2006/0101208 A1 * 5/2006 Kottapalli ............. G06F 12/127 711/134
2011/0072218 A1 * 3/2011 Manne .................. G06F 12/123 711/E12.001
2016/0357680 A1 * 12/2016 Hooker ............... G06F 12/0864
2023/0022190 A1 * 1/2023 Ebrahimi ............ G06F 12/0811
2024/0104025 A1 * 3/2024 George ............... G06F 12/0811

* cited by examiner

*Primary Examiner* — Ryan Bertram
*Assistant Examiner* — Edmund H Kwong
(74) *Attorney, Agent, or Firm* — Kilpatrick Townsend & Stockton LLP

(57) ABSTRACT

Described are methods, data structures, logic, and circuitry which enable a cache replacement policy to track a number of cache states greater than a number of ways in a cache. A cache replacement policy state structure provides that the number of cache states is greater than the N ways for each way per cache index in the cache The additional states can enable different handling and prioritization of data that has been prefetched (prefetch cache states) or loaded with a non-temporal hint from software (non-temporal cache states). The number of prefetcher states and non-temporal states are each less than the number of ways. The non-temporal states can only be promoted to certain of the cache states.

18 Claims, 17 Drawing Sheets

400 410

| CACHE INDEX | WAY 0 | WAY 1 | WAY 2 | WAY 3 | CACHE REPLACEMENT POLICY STATE STRUCTURE (CRPSS) |
|---|---|---|---|---|---|
| 0 | | | | | 1 CRPSS PER WAY |
| 1 | | | | | 1 CRPSS PER WAY |
| 2 | | | | | 1 CRPSS PER WAY |
| 3 | | | | | 1 CRPSS PER WAY |
| 4 | | | | | 1 CRPSS PER WAY |
| . | | | | | . |
| . | | | | | . |
| . | | | | | . |
| N | | | | | 1 CRPSS PER WAY |

420

430

200
202
PROCESSOR
204
214
PERIPHERALS
218
NETWORK COMMUNICATION INTERFACE
216
POWER SOURCE
220
USER INTERFACE
208
210
212
EXECUTABLE INSTRUCTIONS
APPLICATION DATA
OPERATING SYSTEM
206

400

410

| CACHE INDEX | WAY 0 | WAY 1 | WAY 2 | WAY 3 | CACHE REPLACEMENT POLICY STATE STRUCTURE (CRPSS) |
|---|---|---|---|---|---|
| 0 | | | | | 1 CRPSS PER WAY |
| 1 | | | | | 1 CRPSS PER WAY |
| 2 | | | | | 1 CRPSS PER WAY |
| 3 | | | | | 1 CRPSS PER WAY |
| 4 | | | | | 1 CRPSS PER WAY |
| . | | | | | . |
| . | | | | | . |
| . | | | | | . |
| N | | | | | 1 CRPSS PER WAY |

| MRU | MRU-1 | LRU+1 | LRU |
|---|---|---|---|
| MRU | MRU-1 | LRU+1 | MRPF |
| MRU | MRU-1 | LRU+1 | MRNT |
| MRU | MRU-1 | MRPF | LRPF |
| MRU | MRU-1 | MRNT | LRNT |
| MRU | MRU-1 | MRPF | MRNT |
| MRU | MRPF | LRPF | MRNT |
| MRU | MRPF | MRNT | LRNT |
| MRU | LRPF** | MRNT | LRNT |
| MRPF | LRPF | MRNT | LRNT |

FIG. 6

| Initial State | | | | Action | Ending State | | | | |
|---|---|---|---|---|---|---|---|---|---|
| MRU | MRU-1 | LRU+1 | LRU | Demand Load Hits MRU | MRU | MRU-1 | LRU+1 | LRU | |
| | | | | Demand Load Hits MRU-1 | **MRU-1** | **MRU** | LRU+1 | LRU | |
| | | | | Demand Load Hits LRU+1 | **MRU-1** | **LRU+1** | **MRU** | LRU | |
| | | | | Demand Load Hits LRU | **MRU-1** | **LRU+1** | **LRU+1** | **MRU** | |
| | | | | LoadNT hits MRU | MRU | MRU-1 | LRU+1 | LRU | ★ |
| | | | | LoadNT hits MRU-1 | MRU | MRU-1 | LRU+1 | LRU | ★ |
| | | | | LoadNT hits LRU+1 | MRU | MRU-1 | LRU+1 | LRU | ★ |
| | | | | LoadNT hits LRU | MRU | MRU-1 | LRU+1 | LRU | ★ |
| | | | | Incoming Demand Load Fill | **MRU-1** | **LRU+1** | **LRU** | **MRU** (grayed) | |
| | | | | Incoming Prefetch Fill | MRU | MRU-1 | LRU+1 | **MRPF** (grayed) | |
| | | | | Incoming NT Load Fill | MRU | MRU+1 | LRU+1 | **MRNT** (grayed) | |

★ Note: LoadNT that hits MRU-LRU has no effect

BOLD - indicates state change
Grayed - indicates replaced entry

FIG. 7A

| *Initial State* | | | | *Action* | *Ending State* | | | | |
|---|---|---|---|---|---|---|---|---|---|
| *MRU* | *MRU-1* | *LRU+1* | *MRPF* | *Demand Load Hits MRU* | *MRU* | *MRU-1* | *LRU+1* | *MRPF* | |
| | | | | *Demand Load Hits MRU-1* | ***MRU-1*** | ***MRU*** | *LRU+1* | *MRPF* | |
| | | | | *Demand Load Hits LRU+1* | ***MRU-1*** | ***LRU+1*** | ***MRU*** | *MRPF* | |
| | | | | *LoadNT hits MRU* | *MRU* | *MRU-1* | *LRU+1* | *MRPF* | ★ |
| | | | | *LoadNT hits MRU-1* | *MRU* | *MRU-1* | *LRU+1* | *MRPF* | ★ |
| | | | | *LoadNT hits LRU+1* | *MRU* | *MRU-1* | *LRU+1* | *MRPF* | ★ |
| | | | | *Demand Load Hits MRPF* | ***MRU-1*** | ***LRU+1*** | ***LRU+1*** | ***MRU*** | |
| | | | | *Load NT hits MRPF* | *MRU* | *MRU-1* | *LRU+1* | ***MRNT*** | |
| | | | | *Incoming Demand Load Fill* | ***MRU-1*** | ***LRU+1*** | ***LRU*** | ***MRU*** | |
| | | | | *Incoming Prefetch Fill* | *MRU* | *MRU-1* | ***MRPF*** | ***LRPF*** | |
| | | | | *Incoming NT Load Fill* | *MRU* | *MRU+1* | *LRU+1* | ***MRNT*** | |

★ *Note: LoadNT that hits MRU-LRU has no effect*

| ***BOLD*** *- indicates state change* |
|---|
| *Grayed - indicates replaced entry* |

FIG. 7B

| Initial State | | | | Action | Ending State | | | | |
|---|---|---|---|---|---|---|---|---|---|
| MRU | MRU-1 | LRU+1 | MRNT | Demand Load Hits MRU | MRU | MRU-1 | LRU+1 | MRNT | |
| | | | | Demand Load Hits MRU-1 | **MRU-1** | **MRU** | LRU+1 | MRNT | |
| | | | | Demand Load Hits LRU+1 | **MRU-1** | **LRU+1** | **MRU** | MRNT | |
| | | | | LoadNT hits MRU | MRU | MRU-1 | LRU+1 | MRNT | ★ |
| | | | | LoadNT hits MRU-1 | MRU | MRU-1 | LRU+1 | MRNT | ★ |
| | | | | LoadNT hits LRU+1 | MRU | MRU-1 | LRU+1 | MRNT | ★ |
| | | | | Demand Load Hits MRNT | **MRU-1** | **LRU+1** | **LRU+1** | **MRU** | |
| | | | | Load NT hits MRNT | MRU | MRU-1 | LRU+1 | MRNT | |
| | | | | Incoming Demand Load Fill | **MRU-1** | **LRU+1** | **LRU** | **MRU** | |
| | | | | Incoming Prefetch Fill | MRU | MRU-1 | LRU+1 | **LRPF** | |
| | | | | Incoming NT Load Fill | MRU | MRU+1 | **MRNT** | **LRNT** | |

★ Note: LoadNT that hits MRU-LRU has no effect

BOLD - indicates state change
Grayed - indicates replaced entry

FIG. 7C

| Initial State | | | | Action | Ending State | | | | |
|---|---|---|---|---|---|---|---|---|---|
| MRU | MRU-1 | MRPF | LRPF | Demand Load Hits MRU | MRU | MRU-1 | MRPF | LRPF | |
| | | | | Demand Load Hits MRU-1 | **MRU-1** | **MRU** | MRPF | LRPF | |
| | | | | LoadNT hits MRU | MRU | MRU-1 | MRPF | LRPF | ★ |
| | | | | LoadNT hits MRU-1 | MRU | MRU-1 | MRPF | LRPF | ★ |
| | | | | Demand Load Hits MRPF | **MRU-1** | **LRU+1** | **MRU** | **MRPF** | |
| | | | | LoadNT hits MRPF | MRU | MRU-1 | **MRNT** | **MRPF** | |
| | | | | Demand Load Hits LRPF | **MRU-1** | **LRU+1** | MRPF | **MRU** | |
| | | | | LoadNT hits LRPF | MRU | MRU-1 | MRPF | **MRNT** | |
| | | | | Incoming Demand Load Fill | MRU-1 | LRU+1 | LRU | **MRU** (grayed) | |
| | | | | Incoming Prefetch Fill | MRU | MRU-1 | **LRPF** | **MRPF** (grayed) | |
| | | | | Incoming NT Load Fill | MRU | MRU+1 | MRPF | **MRNT** (grayed) | |

★ Note: LoadNT that hits MRU-LRU has no effect

| | |
|---|---|
| **BOLD** - indicates state change | |
| Grayed - indicates replaced entry | |

FIG. 7D

| Initial State | | | | Action | Ending State | | | |
|---|---|---|---|---|---|---|---|---|
| MRU | MRU-1 | MRNT | LRNT | Demand Load Hits MRU | MRU | MRU-1 | MRNT | LRNT |
| | | | | Demand Load Hits MRU-1 | **MRU-1** | **MRU** | MRNT | LRNT |
| | | | | LoadNT hits MRU | MRU | MRU-1 | MRNT | LRNT ★ |
| | | | | LoadNT hits MRU-1 | MRU | MRU-1 | MRNT | LRNT ★ |
| | | | | Demand Load Hits MRNT | **MRU-1** | **LRU+1** | **MRU** | LRNT |
| | | | | LoadNT hits MRNT | MRU | MRU-1 | MRNT | LRNT |
| | | | | Demand Load Hits LRNT | **MRU-1** | **LRU+1** | MRNT | **MRU** |
| | | | | LoadNT hits LRNT | MRU | MRU-1 | **LRNT** | **MRNT** |
| | | | | Incoming Demand Load Fill | **MRU-1** | **LRU+1** | MRNT | **MRU** |
| | | | | Incoming Prefetch Fill | MRU | MRU-1 | MRNT | **MRPF** |
| | | | | Incoming NT Load Fill | MRU | MRU-1 | **LRNT** | **MRNT** |

★ Note: LoadNT that hits MRU-LRU has no effect

BOLD - indicates state change
Grayed - indicates replaced entry

FIG. 7E

| Initial State | | | | Action | Ending State | | | |
|---|---|---|---|---|---|---|---|---|
| MRU | MRU-1 | MRPF | MRNT | Demand Load Hits MRU | MRU | MRU-1 | MRPF | MRNT |
| | | | | Demand Load Hits MRU-1 | **MRU-1** | **MRU** | MRPF | MRNT |
| | | | | LoadNT Hits MRU ★ | MRU | MRU-1 | MRPF | MRNT |
| | | | | LoadNT Hits MRU-1 ★ | MRU | MRU-1 | MRPF | MRNT |
| | | | | Demand Load Hits MRPF | **MRU-1** | **LRU+1** | **MRU** | MRNT |
| | | | | LoadNT hits MRPF | MRU | MRU-1 | **MRNT** | **LRNT** |
| | | | | Demand Load Hits MRNT | **MRU-1** | **LRU+1** | MRPF | **MRU** |
| | | | | LoadNT hits MRNT | MRU | MRU-1 | MRPF | MRNT |
| | | | | Incoming Demand Load Fill | **MRU-1** | **LRU+1** | MRPF | **MRU** |
| | | | | Incoming Prefetch Fill | MRU | MRU-1 | **LRPF** | **MRPF** |
| | | | | Incoming NT Load Fill | MRU | MRU-1 | **MRNT** | **LRNT** |

★ Note: LoadNT that hits MRU-LRU has no effect

BOLD - indicates state change
Grayed - indicates replaced entry

FIG. 7F

| Initial State | | | | Action | Ending State | | | |
|---|---|---|---|---|---|---|---|---|
| MRU | MRPF | LRPF | MRNT | Demand Load Hits MRU | MRU | MRPF | LRPF | MRNT |
| | | | | Load NT Hits MRU ★ | MRU | MRPF | LRPF | MRNT |
| | | | | Demand Load Hits MRPF | **MRU-1** | **MRU** | **MRPF** | MRNT |
| | | | | LoadNT hits MRPF | MRU | **MRNT** | **MRPF** | **LRNT** |
| | | | | Demand Load hits LRPF | **MRU-1** | MRPF | **MRU** | MRNT |
| | | | | Load NT hits LRPF | MRU | MRPF | **MRNT** | **LRNT** |
| | | | | Demand Load hits MRNT | **MRU-1** | MRPF | LRPF | **MRU** |
| | | | | Load NT hits MRNT | MRU | MRPF | LRPF | MRNT |
| | | | | Incoming Demand Load Fill | **MRU-1** | MRPF | LRPF | **MRU** |
| | | | | Incoming Prefetch Fill | MRU | **LRPF** | **MRPF** | MRNT |
| | | | | Incoming NT Load Fill | MRU | MRPF | **MRNT** | **LRNT** |

★ Note: LoadNT that hits MRU-LRU has no effect

| | |
|---|---|
| **BOLD** - indicates state change | |
| Grayed - indicates replaced entry | |

FIG. 7G

| Initial State | | | | Action | Ending State | | | | |
|---|---|---|---|---|---|---|---|---|---|
| *MRU* | *MRPF* | *MRNT* | *LRNT* | *Demand Load Hits MRU* | *MRU* | *MRPF* | *MRNT* | *LRNT* | |
| | | | | *LoadNT Hits MRU* | *MRU* | *MRPF* | *MRNT* | *LRNT* | Note 1 |
| | | | | *Demand Load Hits MRPF* | ***MRU-1*** | ***MRU*** | *MRNT* | *LRNT* | |
| | | | | *LoadNT hits MRPF* | *MRU* | ***LRPF***** | *MRNT* | *LRNT* | Note 2 |
| | | | | *Demand Load hits MRNT* | ***MRU-1*** | *MRPF* | ***MRU*** | *LRNT* | |
| | | | | *Load NT hits MRNT* | *MRU* | *MRPF* | *MRNT* | *LRNT* | |
| | | | | *Demand Load hits LRNT* | ***MRU-1*** | *MRPF* | *MRNT* | ***MRU*** | |
| | | | | *Load NT hits LRNT* | *MRU* | *MRPF* | ***LRNT*** | ***MRNT*** | |
| | | | | *Incoming Demand Load Fill* | ***MRU-1*** | *MRPF* | *MRNT* | ***MRU*** (grayed) | |
| | | | | *Incoming Prefetch Fill* | *MRU* | ***LRPF*** | *MRNT* | ***MRPF*** (grayed) | |
| | | | | *Incoming NT Load Fill* | *MRU* | *MRPF* | ***LRNT*** | ***MRNT*** (grayed) | |

Note 1 LoadNT that hits MRU-LRU has no effect

Note 2 3rd NT

| |
|---|
| ***BOLD*** *- indicates state change* |
| *Grayed - indicates replaced entry* |

FIG. 7H

| Initial State | | | | Action | Ending State | | | | |
|---|---|---|---|---|---|---|---|---|---|
| MRU | LRPF** | MRNT | LRNT | Demand Load Hits MRU | MRU | LRPF** | MRNT | LRNT | Note 2 |
| | | | | LoadNT Hits MRU | MRU | LRPF** | MRNT | LRNT | Note 1 |
| | | | | Demand Load Hits LRPF | **MRU-1** | **MRU** | MRNT | LRNT | |
| | | | | LoadNT hits LRPF | MRU | LRPF** | MRNT | LRNT | Note 2 |
| | | | | Demand Load hits MRNT | **MRU-1** | **MRNT** | **MRU** | LRNT | |
| | | | | Load NT hits MRNT | MRU | **MRNT** | **LRPF**** | **LRNT** | Note 2 |
| | | | | Demand Load hits LRNT | **MRU-1** | **MRNT** | **LRNT** | **MRU** | |
| | | | | Load NT hits LRNT | MRU | MRNT | LRNT | **LRPF**** | Note 2 |
| | | | | Incoming Demand Load Fill | **MRU-1** | LRPF** | MRNT | **MRU** | |
| | | | | Incoming Prefetch Fill | MRU | **MRNT** | **LRNT** | **MRPF** | Note 2 |
| | | | | Incoming NT Load Fill | MRU | **MRNT** | **LRNT** | **LRPF**** | Note 2 |

Note 1 LoadNT that hits MRU-LRU has no effect

Note 2 3rd NT

BOLD - indicates state change
Grayed - indicates replaced entry

FIG. 7I

| Initial State | | | | Action | Ending State | | | | |
|---|---|---|---|---|---|---|---|---|---|
| MRPF | LRPF | MRNT | LRNT | Demand Load Hits MRPF | **MRU** | **MRPF** | MRNT | LRNT | |
| | | | | Load NT hits MRPF | **LRPF** | **MRPF** | MRNT | LRNT | Note 3 |
| | | | | Demand Load Hits LRPF | MRPF | **MRU** | MRNT | LRNT | |
| | | | | LoadNT hits LRPF | MRPF | LRPF | MRNT | LRNT | Note 3 |
| | | | | Demand Load hits MRNT | MRPF | LRPF | **MRU** | **MRNT** | |
| | | | | Load NT hits MRNT | MRPF | LRPF | MRNT | LRNT | |
| | | | | Demand Load hits LRNT | MRPF | LRPF | MRNT | **MRU** | |
| | | | | Load NT hits LRNT | MRPF | LRPF | **LRNT** | **MRNT** | |
| | | | | Incoming Demand Load Fill | MRPF | LRPF | MRNT | **MRU** (grayed) | |
| | | | | Incoming Prefetch Fill | MRPF | LRPF (grayed) | MRNT | LRNT | |
| | | | | Incoming NT Load Fill | MRPF | LRPF | **LRNT** | **MRNT** (grayed) | |

Note 3 leave as low prefetch

| |
|---|
| **BOLD** - indicates state change |
| Grayed - indicates replaced entry |

FIG. 7J

CACHE REPLACEMENT POLICY STATE STRUCTURE WITH EXTRA STATES FOR PREFETCH AND NON-TEMPORAL LOADS

TECHNICAL FIELD

This disclosure relates generally to integrated circuits and, more specifically, a cache replacement policy which uses more cache states than a number of ways in a cache to handle data replacements in the cache.

BACKGROUND

A central processing unit (CPU) or processor core may be implemented according to a particular microarchitecture. As used herein, a "microarchitecture" refers to the way an instruction set architecture (ISA) (e.g., the RISC-V instruction set) is implemented by a processor core. A microarchitecture may be implemented by various components, such as decode units, rename units, dispatch units, execution units, registers, caches, queues, data paths, and/or other logic associated with instruction flow. A processor core may execute instructions in a pipeline based on the microarchitecture that is implemented.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 4 is a block diagram of example of a cache with a cache replacement policy state structure.

FIG. 6 is a diagram of example cache states in a cache replacement policy state structure.

FIGS. 7A-7J are diagrams of example transitions for a cache replacement policy state structure.

DETAILED DESCRIPTION

Figure 1:
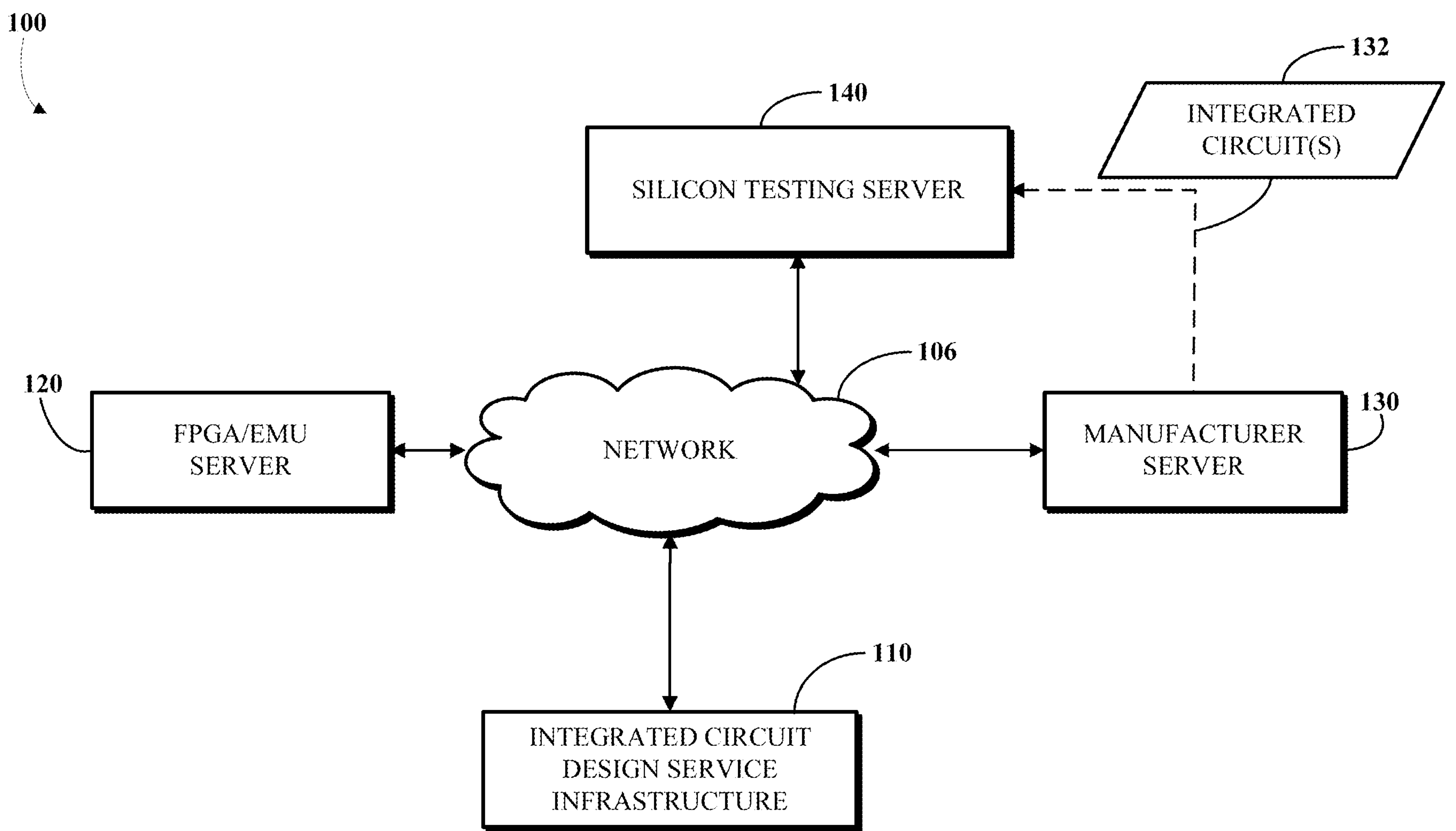
FIG. 1 is a block diagram of an example of a system for facilitating generation and manufacture of integrated circuits.

A processor or processor core may execute instructions in a pipeline based on the microarchitecture that is implemented. The pipeline may be implemented by various components, such as decode units, rename units, dispatch units, execution units, registers, caches, queues, data paths, and/or other logic associated with instruction flow. The processor may execute instructions out-of-order or be an on out-of-order processor. Caches are hardware and/or software components that store data (data cache) or instructions (instruction cache) so that future requests for that data or instruction can be served faster. Each of the processors can have or access a local or level 1 cache (L1 cache) which is connected to one or more shared or remote caches (L2 caches), which in turn is connected to a backing store or memory (collectively a "memory hierarchy").

Caches are typically organized into sets, where a set includes a number of cache lines. In a direct mapped cache, there are multiple sets where each set has one cache line. As such, a memory block or address can only go in that one cache line in the set. In a N-way set associative cache, there are multiple sets where each set has n cache lines. That is, the memory block can go into any of the N cache lines in the set. Alternatively stated, the memory block has N ways of populating a set in the cache. In a fully associative cache, there is one set with all of the cache lines. Depending on the cache type, a cache index can be used to find the set, a tag can be used to find the cache line in the set, and an offset can be used to find the data within the cache line.

The caches use one or more cache replacement algorithms or cache replacement policies which determine how data is replaced in the cache when the cache is full. In an example, a least recently used (LRU) policy discards the least recently used items first. The LRU policy keeps track of what cache line was used and when (i.e., a cache state) with cache index bits or age bits for the cache lines. The cache states are maintained and tracked per way. The LRU policy maintains and tracks 4 states including a most recently used (MRU) state, a next MRU (MRU−1) state, a next LRU (LRU+1) state, and a LRU state. A cache line can be promoted or demoted between the 4 states. Therefore, 2 cache index bits are needed per way. This can be expensive if one wants to make sure the cache replacement always discards the least recently used item. In another example, a pseudo-LRU (PLRU) uses 1 cache index bit per way based on the knowledge that for the vast majority of cases, it is sufficient that the PLRU policy discards one of the least recently used items, i.e., LRU+1 or LRU. The problem with the LRU and PLRU policies is that they do not provide sufficient flexibility for different types of loads or stores (collectively a "memory access") including, but not limited to, demand loads or stores, prefetch loads or stores, and/or non-temporal loads or stores. The processor or software provides a hint or bit selection that a load or store is a non-temporal load or store, which is a load or store that the processor or software knows will be used once or twice (a minimal number of times).

Described are methods, data structures, logic, and circuitry which provide or enable a cache replacement policy to track a number of cache states greater than a number of ways in a cache. The additional states can enable different handling and prioritization of data that has been, for example, prefetched or loaded with a non-temporal hint from software. In implementations, for a 4-way cache for example, a cache replacement policy state structure can use 3 bits to maintain and track 8 states on a per way basis per a cache state diagram or machine. The 8 states can include, but are not limited to, a most recently used (MRU) state, a next MRU (MRU−1) state, a next LRU (LRU+1) state, a LRU state, a most recent prefetch (MRP), a least recent prefetch (LRP) state, a most recent non-temporal (MRNT) state, and a least recent non-temporal (LRNT) state. In implementations, the 3 bits can include the 2 cache index bits used for example in the LRU policy and a repurposed prefetch bit, where the repurposed prefetch bit is also used to indicate if a load or store is from a prefetcher.

In implementations, the number of active or current states in the number of cache states equals the number of ways on a per cache index basis. Cache states for cache lines in a set can be in a variety of combinations subject to cache replacement policy rules. A cache state can be demoted or promoted to other cache states subject to the cache replacement policy rules and cache state diagram. A cache line associated with a cache state can be filled or evicted subject to the cache replacement policy rules and the cache state diagram.

In implementations, a cache replacement policy rule can, on a per cache index basis, enforce that the prefetcher states can be only in half of the active or current states and that the non-temporal states can be only in half of the active or current states. That is, only 2 of the 4 ways may be in a prefetcher state and only 2 of the 4 ways may be in a non-temporal state. In implementations, a cache replacement policy rule can, on a per cache index basis, enforce that the prefetcher states can be promoted to the MRU state, the MRU−1 state, the LRU+1 state, and the LRU state upon a cache line hit, and that the non-temporal states can be only promoted to the LRU+1 state and the LRU state upon a cache line hit. That is, the non-temporal states cannot be promoted to the MRU state and the MRU−1 state.

To describe some implementations in greater detail, reference is first made to examples of hardware and software structures used to implement a system including components that may facilitate a cache replacement policy which can track a number of cache states greater than a number of ways in a cache. FIG. 1 is a block diagram of an example of a system 100 for generation and manufacture of integrated circuits. The system 100 includes a network 106, an integrated circuit design service infrastructure 110 (e.g., integrated circuit generator), a field programmable gate array (FPGA)/emulator server 120, and a manufacturer server 130. For example, a user may utilize a web client or a scripting application program interface (API) client to command the integrated circuit design service infrastructure 110 to automatically generate an integrated circuit design based on a set of design parameter values selected by the user for one or more template integrated circuit designs. In some implementations, the integrated circuit design service infrastructure 110 may be configured to generate an integrated circuit design like the integrated circuit design shown and described in FIGS. 3 and 5. The system 100 and each component in the system 100 is illustrative and can include additional, fewer, or different components which may be similarly or differently architected without departing from the scope of the specification and claims herein. Moreover, the illustrated components can perform other functions without departing from the scope of the specification and claims herein.

The integrated circuit design service infrastructure 110 may include a register-transfer level (RTL) service module configured to generate an RTL data structure for the integrated circuit based on a design parameters data structure. For example, the RTL service module may be implemented as Scala code. For example, the RTL service module may be implemented using Chisel. For example, the RTL service module may be implemented using flexible intermediate representation for register-transfer level (FIRRTL) and/or a FIRRTL compiler. For example, the RTL service module may be implemented using Diplomacy. For example, the RTL service module may enable a well-designed chip to be automatically developed from a high level set of configuration settings using a mix of Diplomacy, Chisel, and FIRRTL. The RTL service module may take the design parameters data structure (e.g., a java script object notation (JSON) file) as input and output an RTL data structure (e.g., a Verilog file) for the chip.

In some implementations, the integrated circuit design service infrastructure 110 may invoke (e.g., via network communications over the network 106) testing of the resulting design that is performed by the FPGA/emulation server 120 that is running one or more FPGAs or other types of hardware or software emulators. For example, the integrated circuit design service infrastructure 110 may invoke a test using a field programmable gate array, programmed based on a field programmable gate array emulation data structure, to obtain an emulation result. The field programmable gate array may be operating on the FPGA/emulation server 120, which may be a cloud server. Test results may be returned by the FPGA/emulation server 120 to the integrated circuit design service infrastructure 110 and relayed in a useful format to the user (e.g., via a web client or a scripting API client).

The integrated circuit design service infrastructure 110 may also facilitate the manufacture of integrated circuits using the integrated circuit design in a manufacturing facility associated with the manufacturer server 130. In some implementations, a physical design specification (e.g., a graphic data system (GDS) file, such as a GDSII file) based on a physical design data structure for the integrated circuit is transmitted to the manufacturer server 130 to invoke manufacturing of the integrated circuit (e.g., using manufacturing equipment of the associated manufacturer). For example, the manufacturer server 130 may host a foundry tape-out website that is configured to receive physical design specifications (e.g., such as a GDSII file or an open artwork system interchange standard (OASIS) file) to schedule or otherwise facilitate fabrication of integrated circuits. In some implementations, the integrated circuit design service infrastructure 110 supports multi-tenancy to allow multiple integrated circuit designs (e.g., from one or more users) to share fixed costs of manufacturing (e.g., reticle/mask generation, and/or shuttles wafer tests). For example, the integrated circuit design service infrastructure 110 may use a fixed package (e.g., a quasi-standardized packaging) that is defined to reduce fixed costs and facilitate sharing of reticle/mask, wafer test, and other fixed manufacturing costs. For example, the physical design specification may include one or more physical designs from one or more respective physical design data structures in order to facilitate multi-tenancy manufacturing.

In response to the transmission of the physical design specification, the manufacturer associated with the manufacturer server 130 may fabricate and/or test integrated circuits based on the integrated circuit design. For example, the associated manufacturer (e.g., a foundry) may perform optical proximity correction (OPC) and similar post-tape-out/pre-production processing, fabricate the integrated circuit(s) 132, update the integrated circuit design service infrastructure 110 (e.g., via communications with a controller or a web application server) periodically or asynchronously on the status of the manufacturing process, perform appropriate testing (e.g., wafer testing), and send to a packaging house for packaging. A packaging house may receive the finished wafers or dice from the manufacturer and test materials and update the integrated circuit design service infrastructure 110 on the status of the packaging and delivery process periodically or asynchronously. In some implementations, status updates may be relayed to the user when the user checks in using the web interface, and/or the controller might email the user that updates are available.

In some implementations, the resulting integrated circuit(s) 132 (e.g., physical chips) are delivered (e.g., via mail) to a silicon testing service provider associated with a silicon testing server 140. In some implementations, the resulting integrated circuit(s) 132 (e.g., physical chips) are installed in a system controlled by the silicon testing server 140 (e.g., a cloud server), making them quickly accessible to be run and tested remotely using network communications to control the operation of the integrated circuit(s) 132. For example, a login to the silicon testing server 140 controlling a manufactured integrated circuit(s) 132 may be sent to the integrated circuit design service infrastructure 110 and relayed to a user (e.g., via a web client). For example, the integrated circuit design service infrastructure 110 may be used to control testing of one or more integrated circuit(s) 132.

Figure 2:
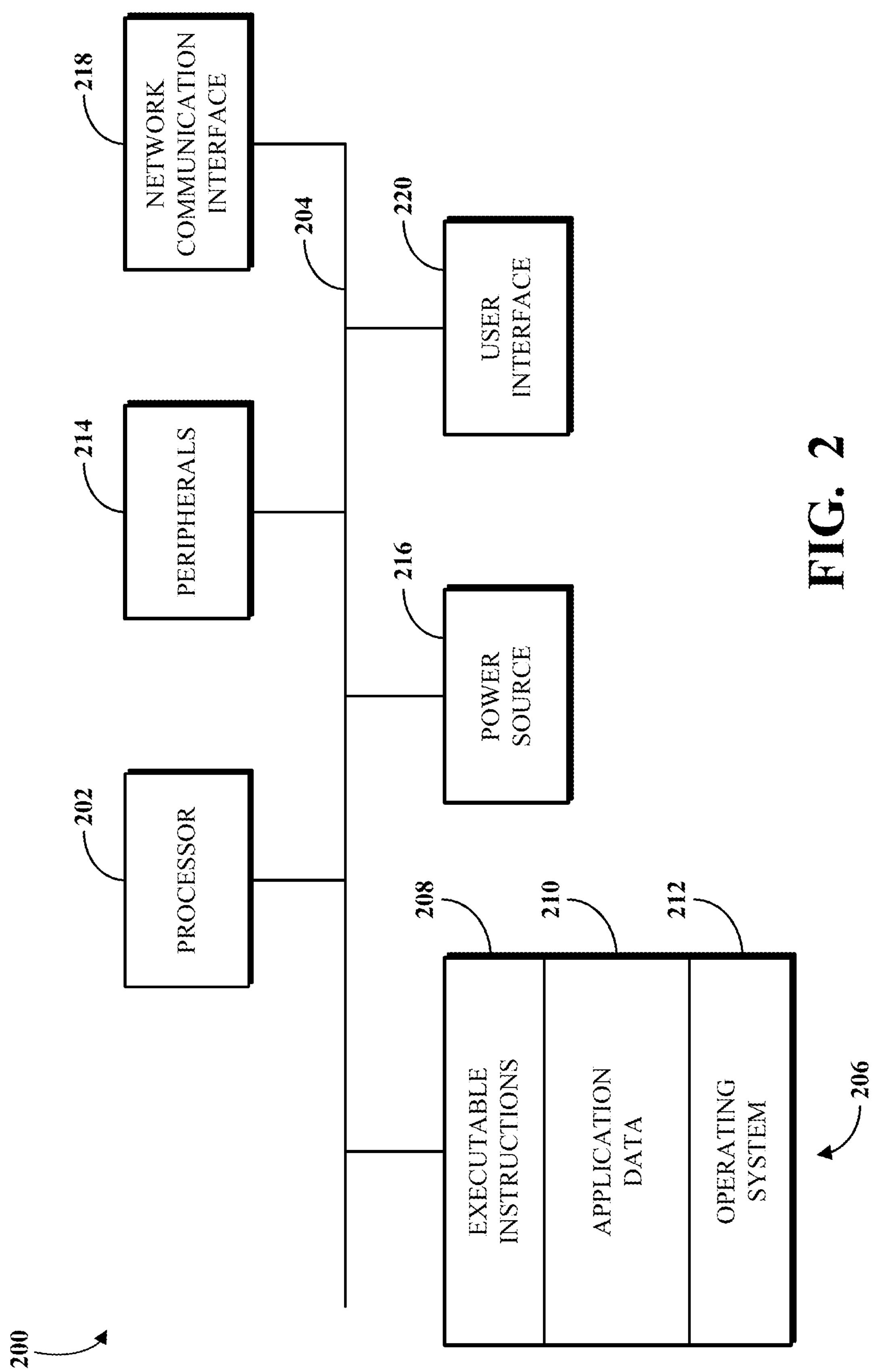
FIG. 2 is a block diagram of an example of a system for facilitating generation of a circuit representation.

FIG. 2 is a block diagram of an example of a system 200 for facilitating generation of integrated circuits, for facilitating generation of a circuit representation for an integrated circuit, and/or for programming or manufacturing an integrated circuit. The system 200 is an example of an internal configuration of a computing device. The system 200 may be used to implement the integrated circuit design service infrastructure 110, and/or to generate a file that generates a circuit representation of an integrated circuit design like the integrated circuit design shown and described in FIGS. 3 and 5. The system 200 and each component in the system 200 is illustrative and can include additional, fewer, or different components which may be similarly or differently architected without departing from the scope of the specification and claims herein. Moreover, the illustrated components can perform other functions without departing from the scope of the specification and claims herein.

The processor 202 can be a central processing unit (CPU), such as a microprocessor, and can include single or multiple processors having single or multiple processing cores. Alternatively, the processor 202 can include another type of device, or multiple devices, now existing or hereafter developed, capable of manipulating or processing information. For example, the processor 202 can include multiple processors interconnected in any manner, including hardwired or networked, including wirelessly networked. In some implementations, the operations of the processor 202 can be distributed across multiple physical devices or units that can be coupled directly or across a local area or other suitable type of network. In some implementations, the processor 202 can include a cache, or cache memory, for local storage of operating data or instructions.

The memory 206 can include volatile memory, non-volatile memory, or a combination thereof. For example, the memory 206 can include volatile memory, such as one or more dynamic random access memory (DRAM) modules such as double data rate (DDR) synchronous DRAM (SDRAM), and non-volatile memory, such as a disk drive, a solid-state drive, flash memory, Phase-Change Memory (PCM), or any form of non-volatile memory capable of persistent electronic information storage, such as in the absence of an active power supply. The memory 206 can include another type of device, or multiple devices, now existing or hereafter developed, capable of storing data or instructions for processing by the processor 202. The processor 202 can access or manipulate data in the memory 206 via the bus 204. Although shown as a single block in FIG. 2, the memory 206 can be implemented as multiple units. For example, a system 200 can include volatile memory, such as random access memory (RAM), and persistent memory, such as a hard drive or other storage.

The memory 206 can include executable instructions 208, data, such as application data 210, an operating system 212, or a combination thereof, for immediate access by the processor 202. The executable instructions 208 can include, for example, one or more application programs, which can be loaded or copied, in whole or in part, from non-volatile memory to volatile memory to be executed by the processor 202. The executable instructions 208 can be organized into programmable modules or algorithms, functional programs, codes, code segments, or combinations thereof to perform various functions described herein. For example, the executable instructions 208 can include instructions executable by the processor 202 to cause the system 200 to automatically, in response to a command, generate an integrated circuit design and associated test results based on a design parameters data structure. The application data 210 can include, for example, user files, database catalogs or dictionaries, configuration information or functional programs, such as a web browser, a web server, a database server, or a combination thereof. The operating system 212 can be, for example, Microsoft Windows®, macOS®, or Linux®; an operating system for a small device, such as a smartphone or tablet device; or an operating system for a large device, such as a mainframe computer. The memory 206 can comprise one or more devices and can utilize one or more types of storage, such as solid-state or magnetic storage.

The peripherals 214 can be coupled to the processor 202 via the bus 204. The peripherals 214 can be sensors or detectors, or devices containing any number of sensors or detectors, which can monitor the system 200 itself or the environment around the system 200. For example, a system 200 can contain a temperature sensor for measuring temperatures of components of the system 200, such as the processor 202. Other sensors or detectors can be used with the system 200, as can be contemplated. In some implementations, the power source 216 can be a battery, and the system 200 can operate independently of an external power distribution system. Any of the components of the system 200, such as the peripherals 214 or the power source 216, can communicate with the processor 202 via the bus 204.

The network communication interface 218 can also be coupled to the processor 202 via the bus 204. In some implementations, the network communication interface 218 can comprise one or more transceivers. The network communication interface 218 can, for example, provide a connection or link to a network, such as the network 106 shown in FIG. 1, via a network interface, which can be a wired network interface, such as Ethernet, or a wireless network interface. For example, the system 200 can communicate with other devices via the network communication interface 218 and the network interface using one or more network protocols, such as Ethernet, transmission control protocol (TCP), Internet protocol (IP), power line communication (PLC), Wi-Fi, infrared, general packet radio service (GPRS), global system for mobile communications (GSM), code division multiple access (CDMA), or other suitable protocols.

A user interface 220 can include a display; a positional input device, such as a mouse, touchpad, touchscreen, or the like; a keyboard; or other suitable human or machine interface devices. The user interface 220 can be coupled to the processor 202 via the bus 204. Other interface devices that permit a user to program or otherwise use the system 200 can be provided in addition to or as an alternative to a display. In some implementations, the user interface 220 can include a display, which can be a liquid crystal display (LCD), a cathode-ray tube (CRT), a light emitting diode (LED) display (e.g., an organic light emitting diode (OLED) display), or other suitable display. In some implementations, a client or server can omit the peripherals 214. The operations of the processor 202 can be distributed across multiple clients or servers, which can be coupled directly or across a local area or other suitable type of network. The memory 206 can be distributed across multiple clients or servers, such as network-based memory or memory in multiple clients or servers performing the operations of clients or servers. Although depicted here as a single bus, the bus 204 can be composed of multiple buses, which can be connected to one another through various bridges, controllers, or adapters.

A non-transitory computer readable medium may store a circuit representation that, when processed by a computer, is used to program or manufacture an integrated circuit. For example, the circuit representation may describe the integrated circuit specified using a computer readable syntax. The computer readable syntax may specify the structure or function of the integrated circuit or a combination thereof. In some implementations, the circuit representation may take the form of a hardware description language (HDL) program, a register-transfer level (RTL) data structure, a flexible intermediate representation for register-transfer level (FIRRTL) data structure, a Graphic Design System II (GDSII) data structure, a netlist, or a combination thereof. In some implementations, the integrated circuit may take the form of a field programmable gate array (FPGA), application specific integrated circuit (ASIC), system-on-a-chip (SoC), or some combination thereof. A computer may process the circuit representation in order to program or manufacture an integrated circuit, which may include programming a field programmable gate array (FPGA) or manufacturing an application specific integrated circuit (ASIC) or a system on a chip (SoC). In some implementations, the circuit representation may comprise a file that, when processed by a computer, may generate a new description of the integrated circuit. For example, the circuit representation could be written in a language such as Chisel, an HDL embedded in Scala, a statically typed general purpose programming language that supports both object-oriented programming and functional programming.

In an example, a circuit representation may be a Chisel language program which may be executed by the computer to produce a circuit representation expressed in a FIRRTL data structure. In some implementations, a design flow of processing steps may be utilized to process the circuit representation into one or more intermediate circuit representations followed by a final circuit representation which is then used to program or manufacture an integrated circuit. In one example, a circuit representation in the form of a Chisel program may be stored on a non-transitory computer readable medium and may be processed by a computer to produce a FIRRTL circuit representation. The FIRRTL circuit representation may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit.

In another example, a circuit representation in the form of Verilog or VHDL may be stored on a non-transitory computer readable medium and may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit. The foregoing steps may be executed by the same computer, different computers, or some combination thereof, depending on the implementation.

Figure 3:
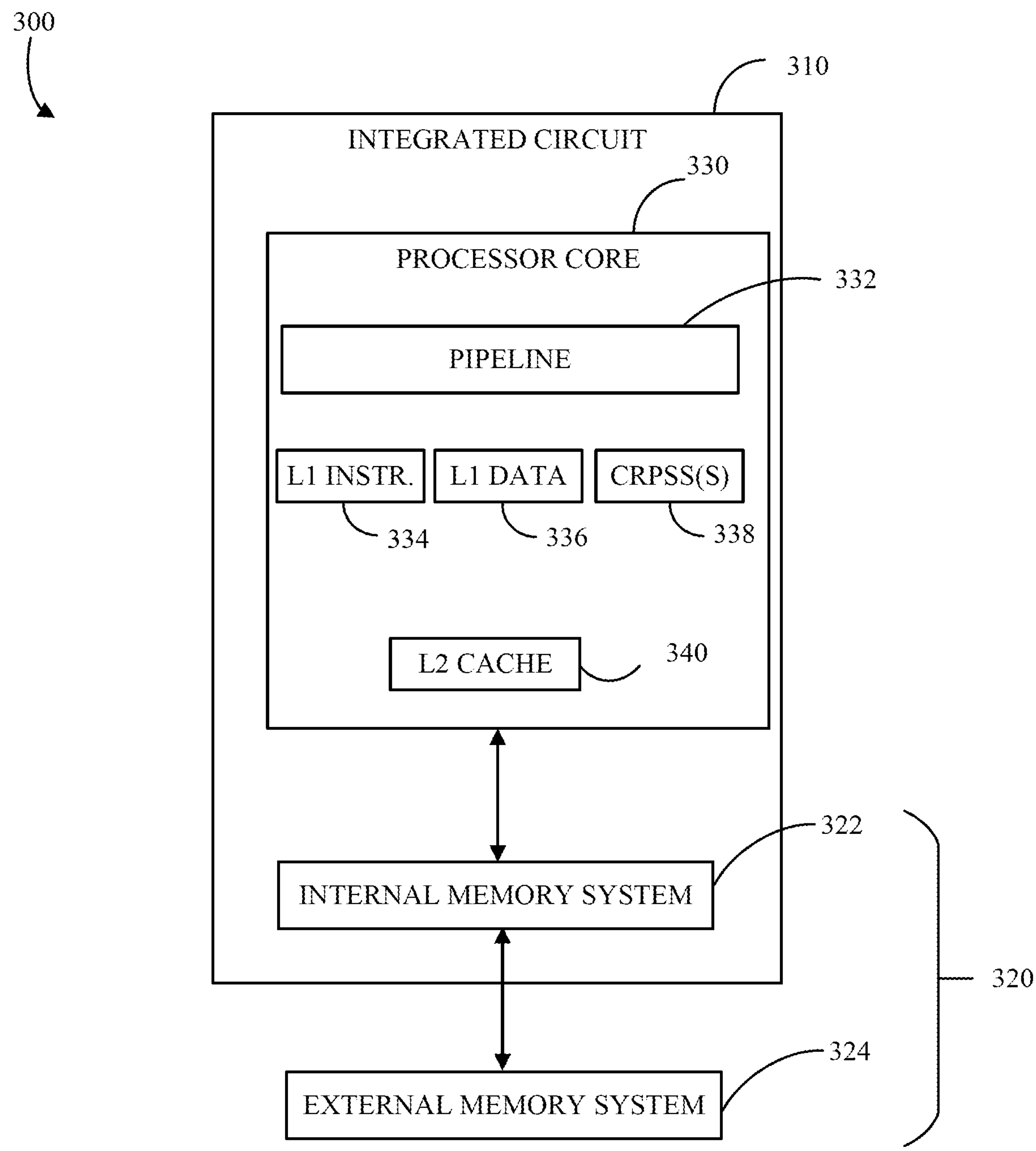
FIG. 3 is a block diagram of an example of an integrated circuit which includes a cache replacement policy state structure which has more states than a number of ways in a cache.

FIG. 3 is a block diagram of an example of a system 300 including an integrated circuit 310 and a memory system 320. The integrated circuit 310 may include a processor core 330. The integrated circuit 310 could be implemented, for example, as a field-programmable gate array (FPGA), an application-specific integrated circuit (ASIC), or a system-on-chip (SoC). The memory system 320 may include an internal memory system 322 and an external memory system 324. The internal memory system 322 may be in communication with the external memory system 324. The internal memory system 322 may be internal to the integrated circuit 310 (e.g., implemented by the FPGA, the ASIC, or the SoC). The external memory system 324 may be external to integrated circuit 310 (e.g., not implemented by the FPGA, the ASIC, or the SoC). The internal memory system 322 may include, for example, a controller and memory, such as random access memory (RAM), static random access memory (SRAM), cache, and/or a cache controller, such as a level three (L3) cache and an L3 cache controller. The external memory system 324 may include, for example, a controller and memory, such as dynamic random access memory (DRAM) and a memory controller. In some implementations, the memory system 320 may include memory mapped inputs and outputs (MMIO), and may be connected to non-volatile memory, such as a disk drive, a solid-state drive, flash memory, and/or phase-change memory (PCM).

The processor core 330 may include circuitry for executing instructions, such as one or more pipelines 332, a level one (L1) instruction cache 334, an L1 data cache 336, a cache replacement policy state structure(s) (CRPSS) 338, and a level two (L2) cache 340 that may be a shared cache. The processor core 330 may fetch and execute instructions in the one or more pipelines 332, for example, as part of a program sequence. The instructions may cause memory requests (e.g., read requests and/or write requests) that the one or more pipelines 332 may transmit to the L1 instruction cache 334, the L1 data cache 336, and/or the L2 cache 340. In implementations, one or more of the L1 instruction cache 334, the L1 data cache 336, and the L2 cache 340 may be N-way set associative caches. In implementations, the L1 instruction cache 334, the L1 data cache 336, and the L2 cache 340 may each include, be associated with, or use a CRPSS 338 to track a number of cache states greater than a number of ways in a cache. Each way in a N-way set associative cache may include, be associated with, or use a CRPSS 338. That is, the CRPSS 338 is per way. Cache replacement policy rules used in conjunction with the CRPSS 338 are applicable on a per set basis. That is, all ways in a set are collectively subject to the cache replacement policy rules. In implementations, a cache controller associated with the cache, software, operating system, and/or cache associated circuitry and software may perform the processing associated with the CRPSS 338 and the cache replacement policy rules.

FIG. 4 is a block diagram of example of a 4-way set associative cache 400 with a cache replacement policy state structure (CRPSS) 410. The 4-way associate cache 400 may include N sets which are indexed using a cache index 420. Each of the N sets may have 4 ways 430, namely, way 0, way 1, way, 2 and way 3. Each of the 4 ways 430 may include, be associated with, or use a CRPSS 410. That is, there are 4 CRPSS' 410 per set. In the case of the 4-way associative cache 400, each CRPSS 410 may be a 3 bit field. Therefore, for each set in the 4-way associative cache 400, there are 4×3 bits. In implementations, the 3 bit field may include a 2 bit cache index state field and a repurposed prefetch bit. The 3 bit field enables each CRPSS 410 to maintain and track 8 states including, but not limited to, a MRU state, a MRU−1 state, a LRU+1 state, a LRU state, a MRP state, a LRP state, a MRNT state, and a LRNT state.

In implementations, 3-bits for a 4-way associative cache provides not only state space for 4 LRU states, but additional state space for prefetch and non-temporal states. This permits managing these later states using a different replacement policy included in the overall cache replacement rules.

Figure 5:
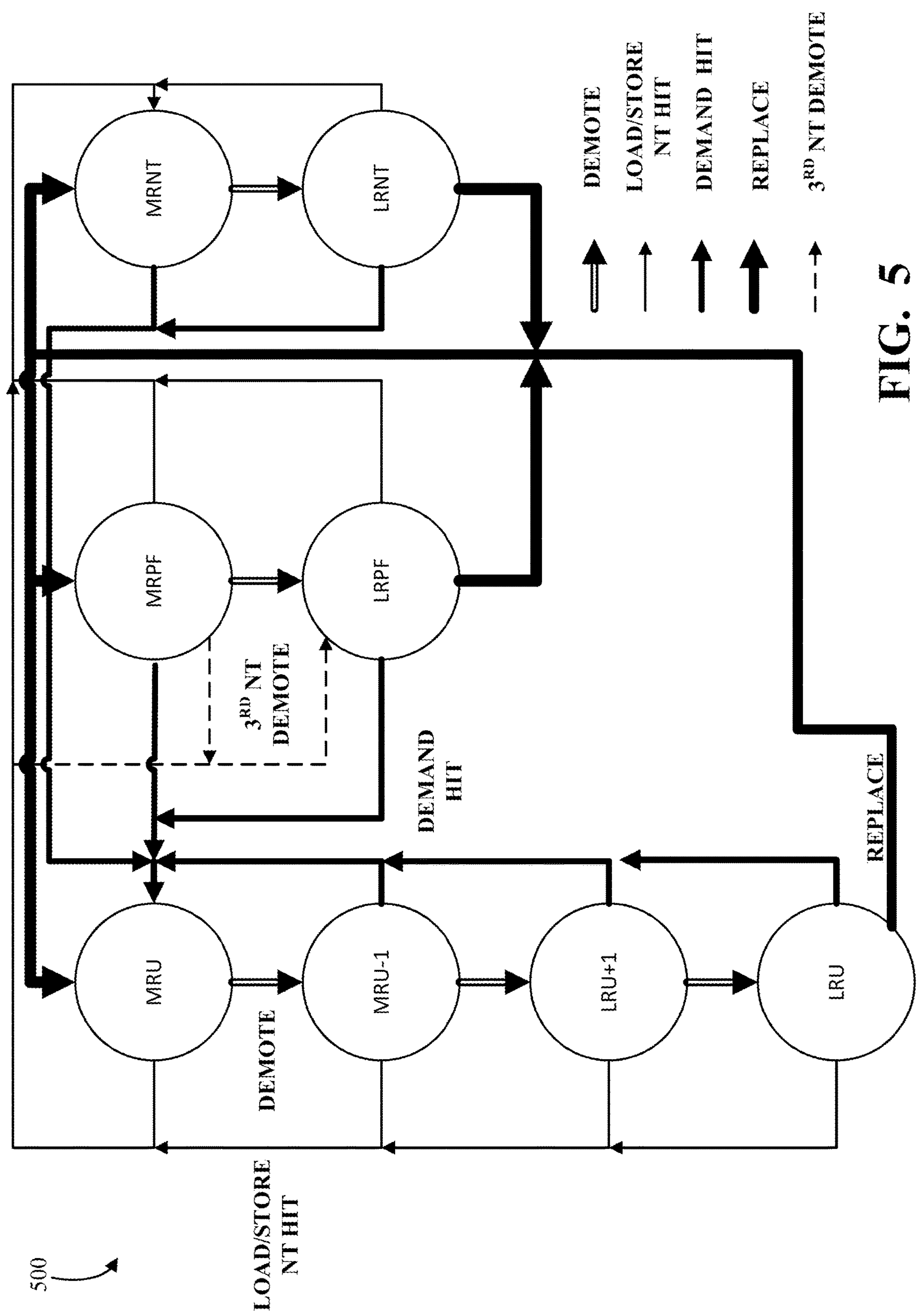
FIG. 5 is a block diagram of example cache replacement policy state diagram.
Figure 8:
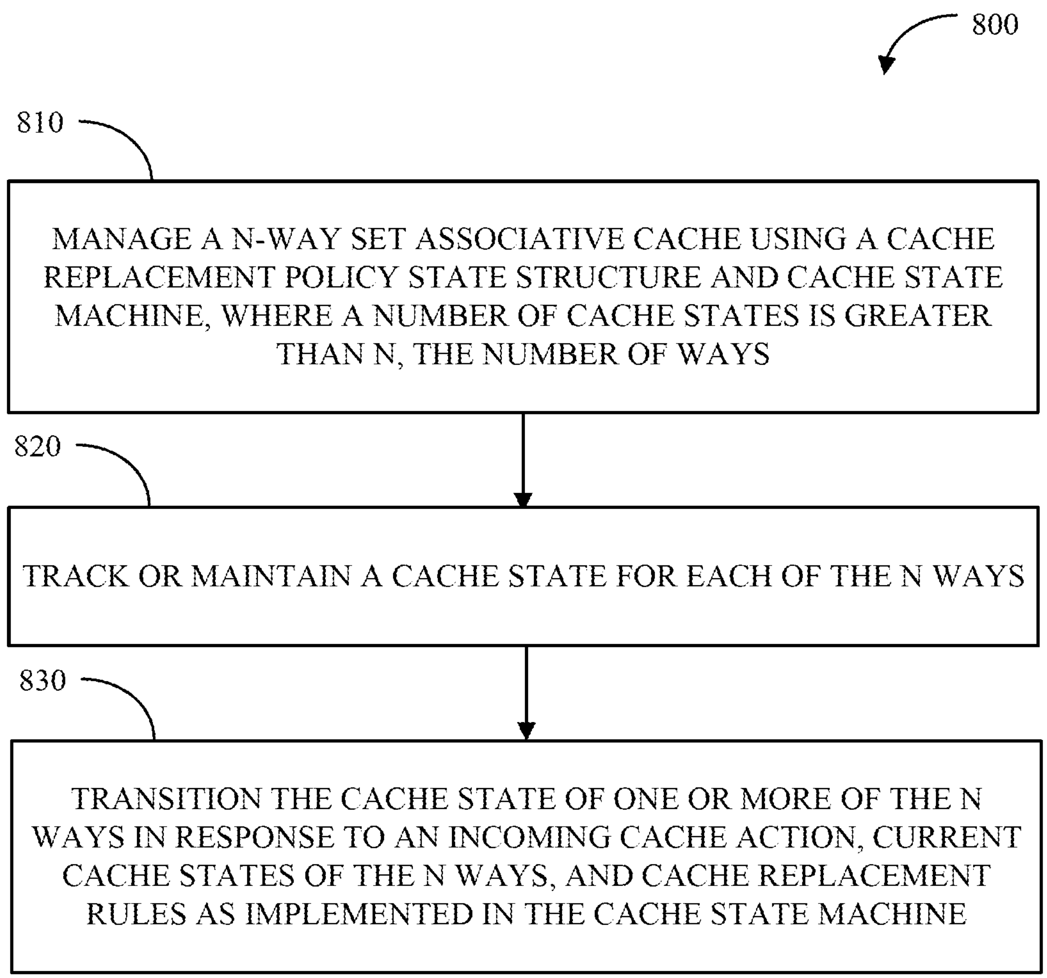
FIG. 8 is a flow chart of a method for transitioning in a cache replacement policy state diagram with a cache replacement policy state structure.

FIG. 5 is a block diagram of example cache replacement policy state machine or diagram 500 for the CRPSS 410 that shows possible transitions between the MRU state, the MRU−1 state, the LRU+1 state, the LRU state, the MRP state, the LRP state, the MRNT state, and the LRNT state as controlled by a cache or cache controller. In the cache replacement policy state diagram 500, the number of active or current states may be equal to the number of ways in a set or per cache index. In implementations, the prefetcher states (i.e., the MRP state and the LRP state) can only occupy half of the active or current states, and the non-temporal states (i.e., the MRNT state and the LRNT state) can only occupy half of the active or current states but the non-temporal states cannot be promoted to the MRU state and the MRU−1 state.

FIG. 6 is a diagram of example valid active or current cache states 600 for the CRPSS 410. The cache states shown do not include modified, exclusive, shared, or invalid states for purposes of illustration. Initially, the cache states are all invalid until data starts filling the cache. The combinations shown are spread across the 4-ways in a set independent of the columns. Cache states for each cache line or way in a set can be in a variety of combinations subject to the cache replacement policy rules. FIGS. 7A-7J are diagrams of example cache state transitions for the CRPSS 410 per the state machine shown in FIG. 5.

Referring now to FIG. 5, FIG. 6, and FIGS. 7A-7J, cache replacement policy rules as applied to or implemented by the cache replacement policy state diagram 500 and the valid active or current cache states 600 are described herein.

The cache replacement policy rules account for multiple aspects when making a change or transition. A prefetch miss, a demand load miss (normal load miss), or a non-temporal load miss will cause a line to be brought into the cache (a fill). The cache and/or cache controller, using the replacement policy rules, chooses based upon the state of the cache lines and the type of incoming line which cache line will be replaced. A prefetch, a demand load, or a non-temporal load may hit a line already in the cache and the cache and/or cache controller, using the replacement policy rules, decides whether the cache line should change state.

In implementations, a demand access (load store) hit to a cache line in a cache index may promote the associated cache state to an MRU state if the cache state is not in the MRU state. In implementations, the MRU−1, the LRU+1, and the LRU states may reshuffle accordingly. In implementations, each of the MRU, MRU−1, and the LRU+1 states may be demoted and data in the LRU state may be evicted, accordingly. In implementations, the cache line that is hit may be a prefetch or a non-temporal.

In implementations, with respect to cache replacement policy rules, a general stack may include the MRU, MRU−1, LRU+1, the LRU states, a prefetch stack may include the MRPF and the LRPF states, and a non-temporal stack may include the MRNT and LRNT states. In most instances, each of the general stack, the prefetch stack, and the non-temporal stack may repack towards the most recent state for a cache line hit except as described herein.

In implementations, with respect to cache replacement policy rules, if a demand access (e.g., a load or a store) hits a cache line with a prefetch, the associated prefetch state may be promoted to the MRU state (now an active or current state in this instance) and a prefetcher can be sent an acknowledgement for training purposes.

In implementations, with respect to cache replacement policy rules, a non-temporal load or store hit against a cache line with a MRU state, a MRU−1 state, a LRU+1 state, or a LRU state may transition the cache state of the hit cache line to a MRNT state. In implementations, the general stack and the non-temporal stack may reshuffle accordingly. In the event that both the MRNT state and the LRNT states already exist, the hit against the cache line may transition the cache state of the hit cache line to a LRPF state or lowest existing prefetch state. In this instance, the non-temporal load or store hit may be treated as a third ($3^{rd}$) non-temporal state in the LRPF state. That is, the LRPF state is demoted to a $3^{rd}$ NT state where there is a LRPF state without a MRPF state (this may be treated as a MRNT+1) (noted as  in FIG. 6 and FIGS. 7A-7**J). If the LRNT state is later replaced by a prefetch or MRU (i.e., a demand hit), then this LRPF state (i.e., acting the $3^{rd}$ NT state) may transition to the MRNT state. In implementations, if the starting states are MRPF/LRPF/MRNT/LRNT and the MRPF state is hit, then swap it with the LRPF. If the LRPF is hit then leave the state as is.

In implementations, a fill or replacement priority may be fill invalid, replace non-temporal, fill prefetch, or replace LRU. That is, incoming data first fills a cache line with invalid data. If there are no invalid cache lines, then replace a cache line with a non-temporal state. If there are no non-temporal states, then replace a cache line with a prefetcher state. If there are no prefetcher states, then replace a cache line with a LRU state.

In implementations, if a prefetch fill comes into a cache index and there are already two prefetch states, the prefetch fill may replace the prefetch associated with the LRPF state. An overflow acknowledgement may be sent to the prefetcher to reduce aggressiveness.

In implementations, if a non-temporal fill comes into a cache index, the non-temporal fill may replace the cache line which has a LRNT state that is active or current. This updated LRNT state may be marked as the MRNT state. If there is no active or current LRNT state, then the lowest priority entry may be replaced and marked as the MRNT state. For example, if the four current entries or four active or current states (out of the eight states) are MRU, MRU−1, LRU+1, LRU and a non-temporal load fill comes in, the non-temporal load fill may replace cache line with the LRU state and may mark itself as the MRNT state. In another example, if the four current entries or four active or current states (out of the eight states) are MRU, MRU−1, LRU+1, MRNT and a non-temporal load fill comes in, the non-temporal load fill may replace the cache line with the MRNT state. In yet another example, if the four current entries or four active or current states (out of the eight states) are MRU, MRU−1, MRNT, LRNT and a non-temporal load fill comes in, the non-temporal load fill may replace cache line with the LRNT state and may mark itself as the MRNT state. The prior cache line with the MRNT state reshuffles to the LRNT state.

In implementations, if a prefetch fill comes into a cache index, the prefetch fill may replace the cache line which has a LRPF state that is active or current. This updated LRPF state may be marked as the MRPF state. If there is no active or current LRPF state, then the lowest priority entry may be replaced and marked as the MRPF state.

In implementations, if a demand access (load or store) fill comes into a cache index, the demand access fill may replace the cache line which has a lowest active or current state. This replaced active or current state may then be marked as the MRU state. A remaining states in the general stack may in be reshuffled.

To further describe some implementations in greater detail, reference is next made to examples of methods which may be performed by using a system implementing a cache replacement policy to track a number of cache states greater than a number of ways in a cache. FIG. 7 is a flow chart of an example of a process 700 for a cache replacement policy to track a number of cache states greater than a number of ways in a cache. The process 700 can be performed, for example, using the systems, hardware, and software described with respect to FIGS. 1-7J. The steps, or operations, of the process 700 or another technique, method, process, or algorithm described in connection with the implementations disclosed herein can be implemented directly in hardware, firmware, software executed by hardware, circuitry, or a combination thereof. Further, for simplicity of explanation, although the figures and descriptions herein may include sequences or series of steps or stages, elements of the methods and claims disclosed herein may occur in various orders or concurrently and need not include all of the steps or stages. Additionally, elements of the methods and claims disclosed herein may occur with other elements not explicitly presented and described herein. Furthermore, not all elements of the methods and claims described herein may be required in accordance with this disclosure. Although aspects, features, and elements are described and claimed herein in particular combinations, each aspect, feature, or element may be used and claimed independently or in various combinations with or without other aspects, features, and elements.

At 710, managing a N-way set associative cache using a cache replacement policy state structure and cache state machine, where a number of cache states is greater than N, the number of ways. A cache replacement policy state structure may be provided which uses a defined number of bits so as to provide a number of cache states greater than a number of ways in a N-way set associative cache. The cache replacement policy state structure may include cache index bit(s) used for providing a number of states equal to or less than the N ways and one or more repurposed bits used for providing a remaining cache states so that the number of cache states is greater than a number of ways. In implementations, a prefetch bit may be repurposed for providing the remaining cache states. In implementations, for a 4-way set associative cache, the defined number of bits may include 2 cache index bits and a repurposed prefetch bit which combine to make a 3-bit field and provide 8 cache states.

At 720, tracking a cache state for each of the N ways. Initially, each of the N ways may be in an invalid state. Upon occurrences of incoming cache actions, each of the N ways may attain or be assigned a cache state subject to cache replacement rules as implemented in a cache state machine.

At 730, transitioning the cache state of one or more of the N ways in response to an incoming cache action, current cache states of the N ways, and cache replacement rules as implemented in the cache state machine. The cache replacement rules as implemented in the cache state machine may define which cache states a way may be in and what cache states a way may transition to. In the instance of the 4-way set associative cache, the cache replacement rules and associated cache state machine are described with respect to FIG. 4, FIG. 5, FIG. 6, and FIGS. 7A-7J.

In implementations, an apparatus includes a set associative cache having N ways, and a cache replacement policy state structure configured to provide a number of cache states greater than the N ways for each way per cache index in the cache. In implementations, the number of cache states include a least recently used (LRU) cache state stack, a defined number of prefetch cache states and a defined number of non-temporal cache states. In implementations, the prefetch cache states can only be assigned to a defined number of ways less than the N ways per cache index. In implementations, an incoming prefetch fills a least recently used prefetch cache state when the prefetch cache states that are assigned are the defined number of ways less than the N ways per cache index. In implementations, the cache is configured to send an overflow acknowledgement to a prefetcher to reduce aggressiveness. In implementations, an incoming prefetch fills a least recently used prefetch cache state or a lowest cache state and assign itself a most recently used prefetch cache state, wherein a fill or replacement priority is fill an invalid cache state, replace a non-temporal cache state, fill a prefetch cache state, or replace a LRU state in the LRU cache state stack. In implementations, the non-temporal cache states can only be assigned to a defined number of ways less than the N ways per cache index. In implementations, an incoming non-temporal fills a least recently used non-temporal cache state or a lowest cache state and assign itself a most recently used non-temporal cache state, wherein a fill or replacement priority is fill an invalid cache state, replace a non-temporal cache state, fill a prefetch cache state, or replace a LRU state in the LRU cache state stack. In implementations, the prefetch cache states can transition to any of the LRU cache state stack upon a cache line hit. In implementations, the non-temporal cache states can transition to a limited set of the LRU cache state stack upon a cache line hit. In implementations, the cache states in the LRU cache state stack can transition to a non-temporal cache state upon a non-temporal cache line hit. In implementations, a fill or replacement priority is fill an invalid cache state, replace a non-temporal cache state, fill a prefetch cache state, or replace a LRU state in the LRU cache state stack.

In implementations, a includes managing a set associative cache with N ways using a cache replacement policy state structure and cache state machine, wherein the cache replacement policy state structure provides a number of cache states greater than the N ways; and transitioning a cache state of one or more of the N ways in response to an incoming cache action with regard to current cache states of each of the N ways and cache replacement rules as implemented in the cache state machine. In implementations, the number of cache states include a least recently used (LRU) cache state stack, a defined number of prefetch cache states and a defined number of non-temporal cache states. In implementations, the prefetch cache states can be assigned to a defined number of ways less than the N ways per cache index. In implementations, the method further includes filling a least recently used prefetch cache state with an incoming prefetch when the prefetch cache states that are assigned are the defined number of ways less than the N ways per cache index. In implementations, the method further includes sending an overflow acknowledgement to a prefetcher to reduce aggressiveness. In implementations, the method further includes filling a least recently used prefetch cache state or a lowest cache state with an incoming prefetch and assigning itself a most recently used prefetch cache state, wherein a fill or replacement priority is fill an invalid cache state, replace a non-temporal cache state, fill a prefetch cache state, or replace a LRU state in the LRU cache state stack. In implementations, the method further includes the non-temporal cache states can be assigned to a defined number of ways less than the N ways per cache index. In implementations, the method further includes filling a least recently used non-temporal cache state or a lowest cache state with an incoming non-temporal and assigning itself a most recently used non-temporal cache state, wherein a fill or replacement priority is fill an invalid cache state, replace a non-temporal cache state, fill a prefetch cache state, or replace a LRU state in the LRU cache state stack. In implementations, the prefetch cache states can transition to any of the LRU cache state stack upon a cache line hit. In implementations, the non-temporal cache states can transition to a limited set of the LRU cache state stack upon a cache line hit. In implementations, the cache states in the LRU cache state stack can transition to a non-temporal cache state upon a non-temporal cache line hit. In implementations, a fill or replacement priority is fill an invalid cache state, replace a non-temporal cache state, fill a prefetch cache state, or replace a LRU state in the LRU cache state stack.

In implementations, a non-transitory computer readable medium comprising a circuit representation that, when processed by a computer, is used to program or manufacture an integrated circuit, includes a set associative cache having N ways; and a cache replacement policy state structure configured to provide a number of cache states greater than the N ways for each way per cache index in the cache. In implementations, the number of cache states include a least recently used (LRU) cache state stack, a defined number of prefetch cache states and a defined number of non-temporal cache states. In implementations, the prefetch cache states can only be assigned to a defined number of ways less than the N ways per cache index. In implementations, an incoming prefetch fills a least recently used prefetch cache state when the prefetch cache states that are assigned are the defined number of ways less than the N ways per cache index. In implementations, the cache is configured to send an overflow acknowledgement to a prefetcher to reduce aggressiveness. In implementations, an incoming prefetch fills a least recently used prefetch cache state or a lowest cache state and assign itself a most recently used prefetch cache state, wherein a fill or replacement priority is fill an invalid cache state, replace a non-temporal cache state, fill a prefetch cache state, or replace a LRU state in the LRU cache state stack. In implementations, the non-temporal cache states can only be assigned to a defined number of ways less than the N ways per cache index. In implementations, an incoming non-temporal fills a least recently used non-temporal cache state or a lowest cache state and assign itself a most recently used non-temporal cache state, wherein a fill or replacement priority is fill an invalid cache state, replace a non-temporal cache state, fill a prefetch cache state, or replace a LRU state in the LRU cache state stack. In implementations, the prefetch cache states can transition to any of the LRU cache state stack upon a cache line hit. In implementations, the non-temporal cache states can transition to a limited set of the LRU cache state stack upon a cache line hit. In implementations, the cache states in the LRU cache state stack can transition to a non-temporal cache state upon a non-temporal cache line hit. In implementations, a fill or replacement priority is fill an invalid cache state, replace a non-temporal cache state, fill a prefetch cache state, or replace a LRU state in the LRU cache state stack.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures.

What is claimed is:

1. An apparatus comprising:

a set associative cache having N ways; and a cache replacement policy state structure configured to provide a number of cache states greater than the N ways for each way per cache index in the cache, wherein the number of cache states include a least recently used (LRU) cache state stack, a defined number of prefetch cache states, and a defined number of non-temporal cache states, and wherein the cache is configured to select a way for replacement from the N ways based on a replacement priority in which a way in a non-temporal cache state is prioritized for replacement over a way in a prefetch cache state, and a way in a prefetch cache state is prioritized for replacement over a way in an LRU cache state.

2. The apparatus of claim 1, wherein the prefetch cache states can only be assigned to a defined number of ways less than the N ways per cache index.

3. The apparatus of claim 2, wherein an incoming prefetch fills a least recently used prefetch cache state when the prefetch cache states that are assigned are the defined number of ways less than the N ways per cache index.

4. The apparatus of claim 3, wherein the cache is configured to send an overflow acknowledgement to a prefetcher to reduce aggressiveness.

5. The apparatus of claim 1, wherein an incoming prefetch fills a least recently used prefetch cache state or a lowest cache state and assign itself a most recently used prefetch cache state, wherein a fill or replacement priority is fill an invalid cache state, replace a non-temporal cache state, fill a prefetch cache state, or replace a LRU state in the LRU cache state stack.

6. The apparatus of claim 2, wherein the non-temporal cache states can only be assigned to a defined number of ways less than the N ways per cache index.

7. The apparatus of claim 6, wherein an incoming non-temporal fills a least recently used non-temporal cache state or a lowest cache state and assign itself a most recently used non-temporal cache state, wherein a fill or replacement priority is fill an invalid cache state, replace a non-temporal cache state, fill a prefetch cache state, or replace a LRU state in the LRU cache state stack.

8. The apparatus of claim 1, wherein the prefetch cache states can transition to any of the LRU cache state stack upon a cache line hit.

9. The apparatus of claim 8, wherein the non-temporal cache states can transition to a limited set of the LRU cache state stack upon a cache line hit.

10. The apparatus of claim 1, wherein the cache states in the LRU cache state stack can transition to a non-temporal cache state upon a non-temporal cache line hit.

11. The apparatus of claim 1, wherein a fill or replacement priority is fill an invalid cache state, replace a non-temporal cache state, fill a prefetch cache state, or replace a LRU state in the LRU cache state stack.

12. A method comprising:

managing a set associative cache with N ways using a cache replacement policy state structure and cache state machine, wherein the cache replacement policy state structure provides a number of cache states greater than the N ways and includes a least recently used (LRU) cache state stack, a defined number of prefetch cache states, and a defined number of non-temporal cache states; selecting a way for replacement from the N ways based on a replacement priority in which a way in a non-temporal cache state is prioritized for replacement over a way in a prefetch cache state, and a way in a prefetch cache state is prioritized for replacement over a way in an LRU cache state; and transitioning a cache state of one or more of the N ways in Response to an incoming cache action with regard to current cache states of each of the N ways and cache replacement rules as implemented in the cache state machine.

13. The method of claim 12, wherein the prefetch cache states can be assigned to a defined number of ways less than the N ways per cache index.

14. The method of claim 13, further comprising:

filling a least recently used prefetch cache state with an incoming prefetch when the prefetch cache states that are assigned are the defined number of ways less than the N ways per cache index.

15. The method of claim 12, further comprising:

filling a least recently used prefetch cache state or a lowest cache state with an incoming prefetch and assigning itself a most recently used prefetch cache state, wherein a fill or replacement priority is fill an invalid cache state, replace a non-temporal cache state, fill a prefetch cache state, or replace a LRU state in the LRU cache state stack.

16. The method of claim 15, further comprising:

filling a least recently used non-temporal cache state or a lowest cache state with an incoming non-temporal and assigning itself a most recently used non-temporal cache state, wherein a fill or replacement priority is fill an invalid cache state, replace a non-temporal cache state, fill a prefetch cache state, or replace a LRU state in the LRU cache state stack.

17. The method of claim 12, wherein the prefetch cache states can transition to any of the LRU cache state stack upon a cache line hit, wherein the non-temporal cache states can transition to a limited set of the LRU cache state stack upon a cache line hit, and wherein the cache states in the LRU cache state stack can transition to a non-temporal cache state upon a non-temporal cache line hit.

18. The method of claim 12, wherein a fill or replacement priority is fill an invalid cache state, replace a non-temporal cache state, fill a prefetch cache state, or replace a LRU state in the LRU cache state stack.

* * * * *